US011506405B2

(12) United States Patent
Long et al.

(10) Patent No.: US 11,506,405 B2
(45) Date of Patent: Nov. 22, 2022

(54) THERMAL MANAGEMENT SYSTEMS AND METHODS

(71) Applicant: Organic Heat Exchangers Limited, Thornton-Cleveleys (GB)

(72) Inventors: Robert Anthony Long, Lancashire (GB); Jonathan Steven, Cumbria (GB)

(73) Assignee: Organic Heat Exchangers Limited, Thornton Cleveleys (GB)

( * ) Notice: Subject to any disclaimer, the term of this patent is extended or adjusted under 35 U.S.C. 154(b) by 241 days.

(21) Appl. No.: 16/476,630

(22) PCT Filed: Jan. 9, 2018

(86) PCT No.: PCT/GB2018/050044
§ 371 (c)(1),
(2) Date: Jul. 9, 2019

(87) PCT Pub. No.: WO2018/127712
PCT Pub. Date: Jul. 12, 2018

(65) Prior Publication Data
US 2019/0360707 A1  Nov. 28, 2019

(30) Foreign Application Priority Data
Jan. 9, 2017  (GB) ...................... 1700348

(51) Int. Cl.
*F24F 5/00* (2006.01)
(52) U.S. Cl.
CPC ............ *F24F 5/0017* (2013.01); *F24F 5/001* (2013.01); *F24F 5/0021* (2013.01); *F24F 2005/0025* (2013.01)

(58) Field of Classification Search
CPC ............ F24F 5/0017; F24F 2005/0025; F24F 5/0021; F25B 25/005
See application file for complete search history.

(56) References Cited

U.S. PATENT DOCUMENTS

| 5,139,549 | A |   | 8/1992 | Knodel et al. |
| 6,158,499 | A | * | 12/2000 | Rhodes ................ F28D 20/021 165/10 |
| 9,488,394 | B1 | * | 11/2016 | El-Shaarawi ......... F24F 5/0014 |
| 2003/0183375 | A1 | * | 10/2003 | Clarksean ............ F24F 5/0021 165/132 |

(Continued)

FOREIGN PATENT DOCUMENTS

CN  204574314 U  8/2015
CN  105953461 A  9/2016
(Continued)

OTHER PUBLICATIONS

International Search Report and Written Opinion for the International Patent Application No. PCT/GB2018/050044, dated Jun. 18, 2018, 19 pages.
(Continued)

*Primary Examiner* — Larry L Furdge
(74) *Attorney, Agent, or Firm* — Banner & Witcoff Ltd.

(57) ABSTRACT

Embodiments provide a thermal management system for supplying stored energy for the purpose of cooling by direct mixing of a common working fluid within a thermal store in which the cooling is realised by phase via latent heat phase change of an ice slurry of the working fluid.

23 Claims, 9 Drawing Sheets

(56) References Cited

U.S. PATENT DOCUMENTS

| | | | | |
|---|---|---|---|---|
| 2009/0093916 A1* | 4/2009 | Parsonnet | ............... | G05B 15/02 |
| | | | | 700/286 |
| 2009/0293507 A1* | 12/2009 | Narayanamurthy | .. | F24F 5/0017 |
| | | | | 62/59 |
| 2014/0165616 A1* | 6/2014 | Grabon | ...................... | F25C 5/18 |
| | | | | 62/66 |
| 2014/0298829 A1* | 10/2014 | Dobbs | ........................ | F25D 3/02 |
| | | | | 62/56 |
| 2015/0128620 A1* | 5/2015 | Langheinz | ............... | F28D 20/02 |
| | | | | 62/68 |
| 2016/0339761 A1* | 11/2016 | Enomoto | ............ | B60H 1/00278 |
| 2017/0248338 A1* | 8/2017 | Ray | ........................ | G05B 15/02 |

FOREIGN PATENT DOCUMENTS

| | | |
|---|---|---|
| EP | 1818632 A2 | 8/2007 |
| JP | 3477317 B2 | 12/2003 |
| JP | 2005338028 A | 12/2005 |
| KR | 20110058066 A | 6/2011 |

OTHER PUBLICATIONS

Examination Report, dated May 25, 2021, issued in corresponding Application No. GB 1700348.4.

* cited by examiner

200

THERMAL MANAGEMENT SYSTEMS AND METHODS

CROSS-REFERENCE TO RELATED APPLICATIONS

This application is a national phase claiming the benefit of and priority to International Patent Application No. PCT/GB2018/050044, entitled "THERMAL MANAGEMENT SYSTEMS AND METHODS", filed Jan. 9, 2018, which claims priority to Great Britain Patent Application No. 1700348.4, filed Jan. 9, 2017, which are hereby incorporated by reference in their entireties.

BACKGROUND

There is an ever-increasing need to closely match supply and demand for electricity. Power companies such as, for example, the National Grid in the UK have a need for a range of balancing services directed to addressing potential or actual mismatches between supply and demand for electricity. Such balancing services can comprise Frequency Response Services. The system frequency or frequency of supply varies with variation in demand. The frequency of the supply is determined, monitored and controlled in real-time. It aims to strike a balance between system generation and system demand. If demand exceeds supply, the frequency of the supply falls and vice versa.

The National Grid has a licence obligation to control the frequency to within prescribed statutory tolerances. There are two types of frequency response; namely, dynamic frequency response and non-dynamic frequency response. The former is continuously variable in real-time whereas the latter is implemented in response to a defined trigger event.

Other balancing services comprise, for example, Demand Side Response (DSR) services via which a consumer's electrical energy demands can be varied, that is, increased or decreased or time-shifted in real time. For example, a server farm will have considerable cooling requirements that vary throughout the day as load on the servers varies. At peak times, any cooling or conditioning systems will have to meet those demands. The alternative, in the absence of sufficient cooling, is to reduce the processing capacity being made available by the server farm, which will adversely affect revenues.

However, it can be appreciated that the power companies have a limited resource and a continuously variable demand. In certain circumstances, there is potential for the demand to exceed supply. In such circumstances, power companies are expected to react quickly in an effort to manage supply and demand. The various load balancing services can have response times of the order of mere seconds. For example, the Dynamic Frequency Response Service can be configured to deliver a response, either up or down, within a predetermined time of between 2 seconds and 30 minutes. The National Grid requires of the order of 1.5 GW of dynamic frequency response to be available at any given time. The 1.5 GW comprises 1 GW associated with a relatively low response time and 0.5 GW of high response time.

BRIEF DESCRIPTION OF THE DRAWINGS

Aspects, features and advantages of embodiments will become apparent from the following description given in reference to the accompanying drawings in which like numerals denote like elements and in which.

DETAILED DESCRIPTION

Figure 1:
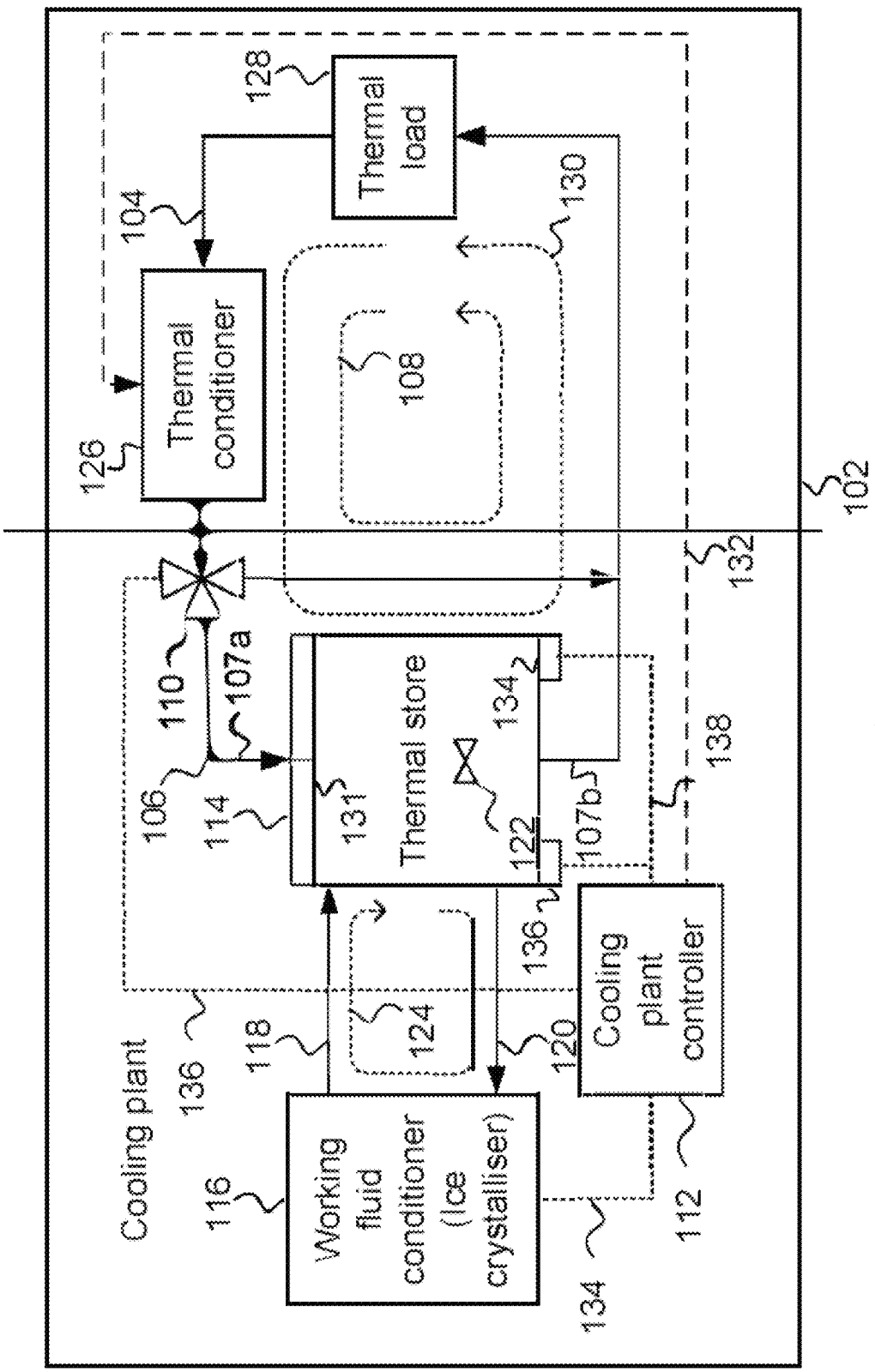
FIG. 1 illustrates a cooling system according to embodiments.

Referring to FIG. 1 there is shown a view 100 of a thermal management system 102 according to an embodiment. The thermal management system 102 comprises a primary circuit 104 and a secondary circuit 106. The primary circuit 104 and secondary circuit 106 both carry a common or shared working fluid. Circulation of the working fluid around the primary circuit 104 is shown using arrow 108. The primary circuit 104 comprises a thermal conditioner 126. The thermal conditioner 126 is operable to influence the operating conditions of a thermal load 128. For example, the thermal conditioner 126 is operable to reduce, maintain or otherwise manage the temperature of the thermal load 128 using the working fluid circulating within the primary circuit 104. Embodiments of a thermal conditioner 126 can comprise an industrial refrigeration plant. For example, an industrial refrigeration plant can comprise refrigerant to one or more of the following fluid heat exchanger, drive-motor and refrigerant compressor, condenser and attendant pipe-work, one or more working fluid transportation pumps taken jointly and severally.

By way of example, the thermal conditioner 126 could be arranged to cool the thermal load 128 to regulate the temperature of the thermal load 128 by cooling the working fluid circulating in the primary circuit 104 that, in turn, cools the thermal load 128.

A divert valve 110 is provided to divert working fluid from the primary circuit 104 into the secondary circuit 106. The divert valve 110 is responsive to a controller 112, an embodiment of which is shown in the form of a cooling plant controller. The secondary circuit comprises a thermal store 114 and a pair 107a and 107b of conduits coupling the thermal store 114 to the primary circuit 104. An embodiment of a thermal store is a battery such as, for example, a battery storing a phase change material. The battery or thermal store can comprise one or more cells containing the phase change material. Embodiments can be realised in which the phase change material is ice. A battery comprising ice slurry as a phase change material is known as an ice battery. The thermal store 114 is used to store the working fluid. An embodiment of such a working fluid comprises an ice slurry. The ice slurry comprising a mixture of ice particles derived from the working fluid and the working fluid in a liquid phase. The working fluid in such state comprising ice particles, derived from the working fluid, in a solid phase in addition, or as opposed, to the working fluid in a liquid phase is known as an ice slurry. An ice slurry comprises fluids and solids in a predetermined concentration. Such a predetermined concentration comprises a predetermined percentage range of, for example, 1% to substantially 66⅔rd % of working fluid in the solid phase relative to the working fluid in the liquid phase; beyond 66⅔rd % the working fluid becomes a structure rather than a slurry.

The working fluid in the secondary circuit 106 is converted from a liquid phase into such an ice slurry via a working fluid conditioner 116. An embodiment of a working fluid conditioner 116 is an ice crystalliser. The working fluid conditioner 116 is coupled to the thermal store 114 via a pair of flow and return conduits 118 and 120. Working fluid in the liquid phase can be drawn from the thermal store 114 via the return conduit 120, processed by the working fluid conditioner 116 and returned to the thermal store as an ice slurry of the working fluid via the flow conduit 118. It will be appreciated that the ice particles float in the working fluid, which is why the working fluid is drawn from the bottom of the thermal store 114. Therefore, it can be appreciated that the working fluid can circulate between the thermal store 114 and the working fluid conditioner 116 as indicated by circulation path 124.

The thermal store 114 can, optionally, comprise an agitator 122 for stirring the ice slurry of the working fluid. Stirring or otherwise agitating the ice slurry prevents the ice slurry from coalescing.

The controller 112 is operable to influence the operation of at least one or more than one of the divert valve 110, the working fluid conditioner 116 and the thermal conditioner 126 taken jointly and severally in any and all permutations.

When the divert valve 110 is open, that is, in a state in which the primary circuit 104 is in fluid communication with the secondary circuit 106 to divert working fluid from the primary circuit 104 into the secondary circuit 106, a circulation path 130 comprising conduits of both the primary circuit 104 and the secondary circuit 106 is created. Working fluid from the primary circuit 104 is diverted, via the divert valve 110 and a conduit 107a of the secondary circuit 106 into the thermal store 114 that contains the ice slurry of the working fluid. The working fluid from the primary circuit 104 enters the thermal store 114 where it is rapidly cooled by the ice slurry. The cooling process relies upon a phase change of the ice particles within the working fluid from the solid phase into the liquid phase, that is, by latent heat of fusion for a phase change. It can be appreciated that this is in contrast to cooling that relies upon, or relies solely, upon sensible heat.

The thermal store can, optionally, comprise a distributor 131 for distributing the working fluid diverted from the primary circuit 104 over or throughout the ice slurry within the thermal store 114. For example, a distributor can be realised in the form of a number of apertures or nozzles through which the working fluid can pass.

At least one of the agitator 122 and the distributor 131 can be used to influence the rate of conversion of the ice particles within the ice slurry from the solid phase to the liquid phase, that is, to influence the release or use of the latent heat energy in cooling the working fluid.

The thermal conditioner 126 is responsive to one or more than one control signal 132 associated with the controller 112. The working fluid conditioner 116 is responsive to one or more than one control signal 134 associated with the controller 114. The divert valve 110 is responsive to one or more than one control signal 136 associated with the controller 112.

The thermal conditioner 126 can be controlled using the one or more control signal 132 in a number of ways. For example, the thermal conditioner 126 can be arranged to vary the amount of thermal conditioning of the working fluid circulating in the primary circuit 104. As an example, rather than the thermal conditioner 126 being operable to keep or urge the working fluid at or towards a temperature of $t_1$, the thermal conditioner 126 can be arranged to keep the working fluid at a temperature of $t_2$ where $t_1$ is different to $t_2$ such as, for example, $t_2 > t_1$, $t_2 >= t_1$, $t_2 < t_1$, or $t_2 <= t_1$.

Alternatively, or additionally, the thermal conditioner 126 can be arranged to increase the amount of cooling, that is, thermal conditioning, applied to the working fluid circulating in the primary circuit 104. For example, the thermal conditioner 126 can be arranged to keep the working fluid circulating in the primary circuit at, or to urge the working fluid towards, a temperature $t_1$ that is greater than a current or previous temperature $t_2$.

Additionally, or alternatively, the controller 112 can be arranged to switch the thermal conditioner 126 into one or more than one power mode. The one or more than one power mode can comprise at least one of a lower power mode of operation relative to a current power mode of operation, a higher power mode of operation relative to a current mode of operation or some other power mode of operation. A lower power mode can comprise an "off" mode in which the thermal conditioner 126 does not condition the working fluid circulating in the primary circuit 104. A higher power mode can comprise, for example, switching the thermal conditioner 126 to an "on" state in which the thermal conditioner 126 is arranged to influence or otherwise control the temperature of the working fluid circulating in the primary circuit 104. For example, the foregoing can be brought to bear where stored energy is or was derived at a lower electrical tariff relative to a current or prevailing electrical tariff for the thermal conditioner 126.

In all cases, the working fluid circulating in the primary circuit 104 is arranged or intended to influence the condition of the thermal load 128, in particular, to maintain the thermal load at a predetermined temperature or within a range of temperatures or to urge the thermal load towards such a predetermined temperature or range of temperatures.

The controller 112, via the one or more than one control signal 134, can influence the operation of the ice crystalliser 116. Embodiments can be realised in which the ice crystallizer 116 can be selectively switched between states. In one such state the ice crystalliser or working fluid conditioner 116 is arranged to produce an ice slurry of the working fluid. Another state of operation of the working fluid conditioner 116 comprises a state in which the working fluid conditioner 116 no longer creates such an ice slurry.

The controller 112 can be arranged to control the working fluid conditioner 116 in response to one or more than one condition or event. The one or more than one condition or event can comprise at least one of a particular time or period of day having been reached, the thermal store having reached its maximum, or other predetermined, capacity or any other condition.

The event or condition associated with a predetermined time or period of a day may correspond to a time or period having a respective electricity tariff associated with that predetermined time or period. Therefore, for example, operation of the working fluid thermal conditioner 116 can be time shifted, that is, arranged to occur during periods in which lower cost electricity is available for driving or operating the working fluid conditioner 116 even though there may or may not be a demand for the cooling energy stored within the thermal store 114. Therefore, the thermal store 114 can be charged or replenished with the ice slurry. Suitably, embodiments can be realised in which the working fluid thermal conditioner 116 is operable using lower cost electricity to charge or replenish the thermal store 114 with an ice slurry of the working fluid.

The controller 112, via the one or more than one control signal 136, can be arranged to switch the divert valve 110 between at least two states. In a first state, the working fluid within the primary circuit 104 is diverted into the secondary circuit 106 to the thermal store and lower temperature working fluid is discharged from the thermal store 114 and mixed, as a common working fluid, with, or forms, the working fluid contained within the primary circuit 104. Furthermore, any such operation of the divert valve 110 can be arranged to coincide with, or be related to, a change in operation of another element of the system 100. For example, the operation of the divert valve 110 can be influenced by or associated with the operation of the thermal conditioner 126. Embodiments can be realised in which the divert valve 110 is arranged to be synchronised with or influenced by a change in the working condition of the thermal conditioner 126. Such a change can be, for example, the thermal conditioner 126 being switched to a lower power mode and, in particular, the thermal conditioner 126 being switched into a state in which it no longer conditions the working fluid circulating in the primary circuit. It will be appreciated that in the latter case, the latent heat of fusion stored within the thermal store is used to condition the working fluid to be circulated through the primary circuit 104 for influencing the thermal load 128. The energy stored within the thermal store 114 is used as a replacement for the cooling effect of the thermal conditioner 126.

Alternatively, or additionally, embodiments can be realised in which the divert valve 110 diverts working fluid from the primary circuit 104 into the secondary circuit 106 and though the thermal store to cool the working fluid entering or in the primary circuit 104 in conjunction, or in parallel, with the thermal conditioner 126 cooling the working fluid circulating in the primary circuit 104. Such a supplementary mode of operation can be used to meet or react to peaks in demand for cooling. For example, the cooling demands of the thermal load 128 may be within relatively well defined limits over a predetermined period but variable nevertheless in such a way that a peak or spike in cooling demand occurs over or at some other period. Ordinarily, the thermal condition would be designed and installed to be able to meet the peak or spike in demand, which would mean that for the majority of the time the thermal conditioner 126 is operating well below a maximum, or other, level of possible performance. Embodiments can be realised in which the thermal conditioner can be, or is, designed, installed and operated to address the performance needs over the predetermined period within the relatively well defined limited period and that such supplementary operation is used to cope with such peaks or spikes in demand. For example, it may be the case that the cooling requirements of a server farm, or other entity, are relatively constant or stable for the majority of the day, but that a spike arises at 8 pm, or at some other time of day. A thermal conditioner 126 could be dimensioned or otherwise designed, installed and operated to cope with the relatively constant or stable demands over the majority of the day and embodiments can be used to provide cooling that address the demands of the peak or spike.

The divert valve 110 can be operated in or switched to a second state in which the working fluid circulating in the primary circuit 104 is no longer diverted into the secondary circuit 106. Any such switch into the second state can be related to or associated with the state of operation of the thermal conditioner 126. For example, if the thermal conditioner 126 has been switched on, that is, has been switched into a state in which it conditions the working fluid circulating in the primary circuit 104, there could no longer be a need to divert the working fluid from the primary circuit 104 into the secondary circuit 106 for cooling.

Furthermore, the controller 112 can be arranged to control the working fluid conditioner 116 in response to the operating state of the thermal conditioner 126. For example, if the working fluid conditioner 116 has a lower power consumption than the thermal conditioner 126, the working fluid conditioner 116 can be arranged to operate in antiphase with the thermal conditioner 126, in particular, if the thermal conditioner is switched "off", the working fluid conditioner 116 can be switched on.

The thermal store 114 has associated with it means of weighing or determining the weight of the thermal store 114. It will be appreciated that the weight of the thermal store in combination with the ice slurry of the working fluid will vary as the proportion or fraction of the ice slurry relative to the working fluid in liquid phase varies. As the proportion of the ice slurry increases, the combined weight of the thermal store and the working fluid decreases, and vice versa. The weight can be determined using one or more than one load cell. In the embodiment depicted a pair of load cells 134 and 136 are used. The load cells 134 and 136 are coupled to the controller 112 via one or more than one control line or control signal. The weight of the thermal store 114 in combination with its content is used to determine the energy capacity of the thermal store.

Embodiments can be realised in which the thermal store is arranged to be free of any gas or medium, in particular, any gas or medium that could cause a crust, or other solid layer, of the ice slurry to form. Such a crust or solid layer could prevent, or at least adversely affect, the flow of working fluid diverted from the primary circuit 104 through the ice slurry stored within the thermal store 114. Embodiments can be realised in which the thermal store presents a gas free environment, that is, the thermal store contains only at least one, or both, of ice slurry and working fluid from which the ice slurry is derived. Further embodiments can be realised in which the thermal store contains only working fluid. Optionally, the embodiments can provide a depressant, in the working fluid to influence its crystallization properties.

Figure 2:
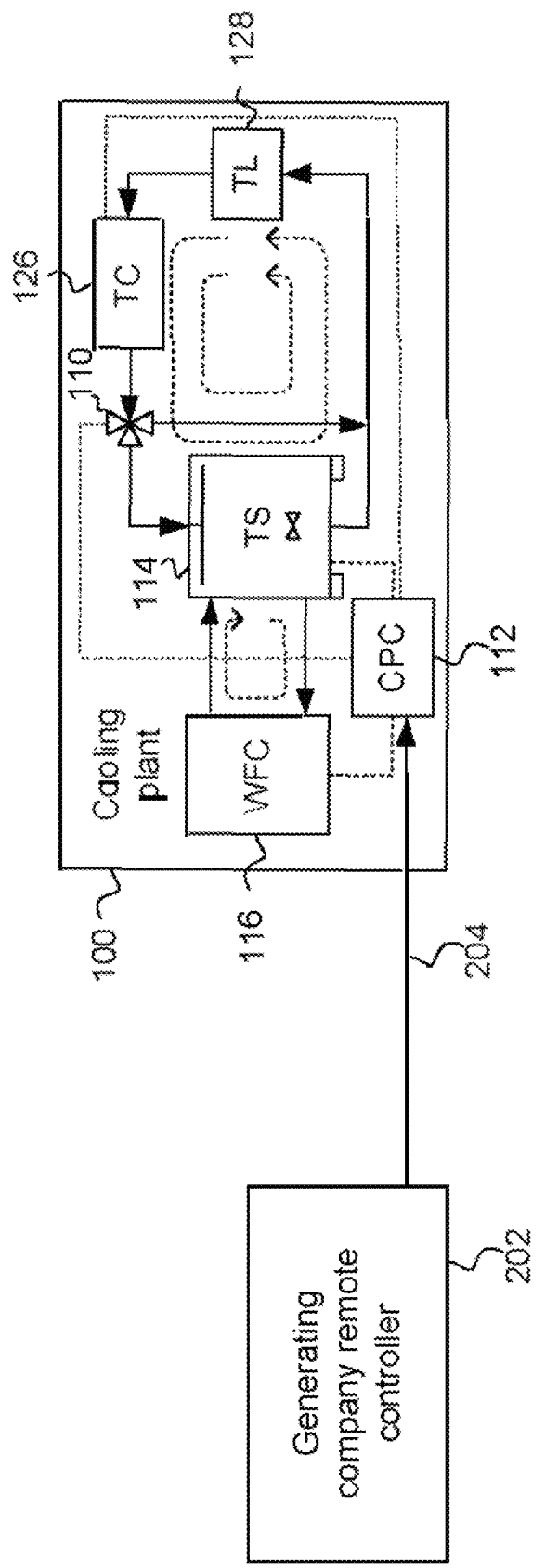
FIG. 2 shows remote control of a cooling system according to embodiments.

Referring to FIG. 2, there is shown a view 200 of the system 102 described above with reference to FIG. 1 under the control of a further controller. Embodiments of such a further controller can comprise, for example, a control system 202 associated with a power generating, power supply or other power control company such as an aggregator. The control system 202 is in communication with the controller 112 via respective signalling 204. The respective signalling 204 can be arranged to instruct the controller 112 to at least change the power consumption state of one or more than one element of the system 102. The change in the power consumption state can comprise switching the one or more than one element of the system 102 on or off, as described above, with reference to FIG. 1. Therefore, the controller 202 can instruct the system 102 to switch on or off the thermal conditioner 126 or to switch the thermal conditioner 126 into a different power consumption state.

The system controller 202 can be arranged to issue such a command in response to a need to release the power being presently consumed by the thermal conditioner 126 for other purposes. For example, if the power company determines that the demand for electricity is about to exceed the supply of that electricity or has exceeded the supply of that electricity, the system controller 202 can instruct the controller 112 to switch the thermal conditioner 126, or any other element of the system 102, into a lower power operating mode such as the above described off mode.

However, it will be appreciated that there may still be a need for the state of the thermal load to be maintained or conditioned. Therefore, in response to such a command from the system controller 202, the working fluid circulating in the primary circuit can be diverted, via operation of the divert valve 110, into the secondary circuit 106, where that working fluid will pass through the working fluid in the solid phase contained within the thermal store 114. Under such conditions, it will be appreciated that the thermal store 114 will be progressively discharged, that is, the cooling effect by latent heat of fusion will be realised by melting the ice particles of the ice slurry and used in cooling in the working fluid circulating in the primary circuit 104 to at least influence, or maintain, a condition of the thermal load 128.

Therefore, the power supply company or other controlling entity such as, for example, an aggregator, can remotely control the operation of the system 102 if circumstances demand such control. Accordingly, the remote system controller 202 can switch on or off the thermal conditioner 126, or any other entity, of the system 102 according to whether or not demand for electricity can be met using the present supply.

Figure 3:
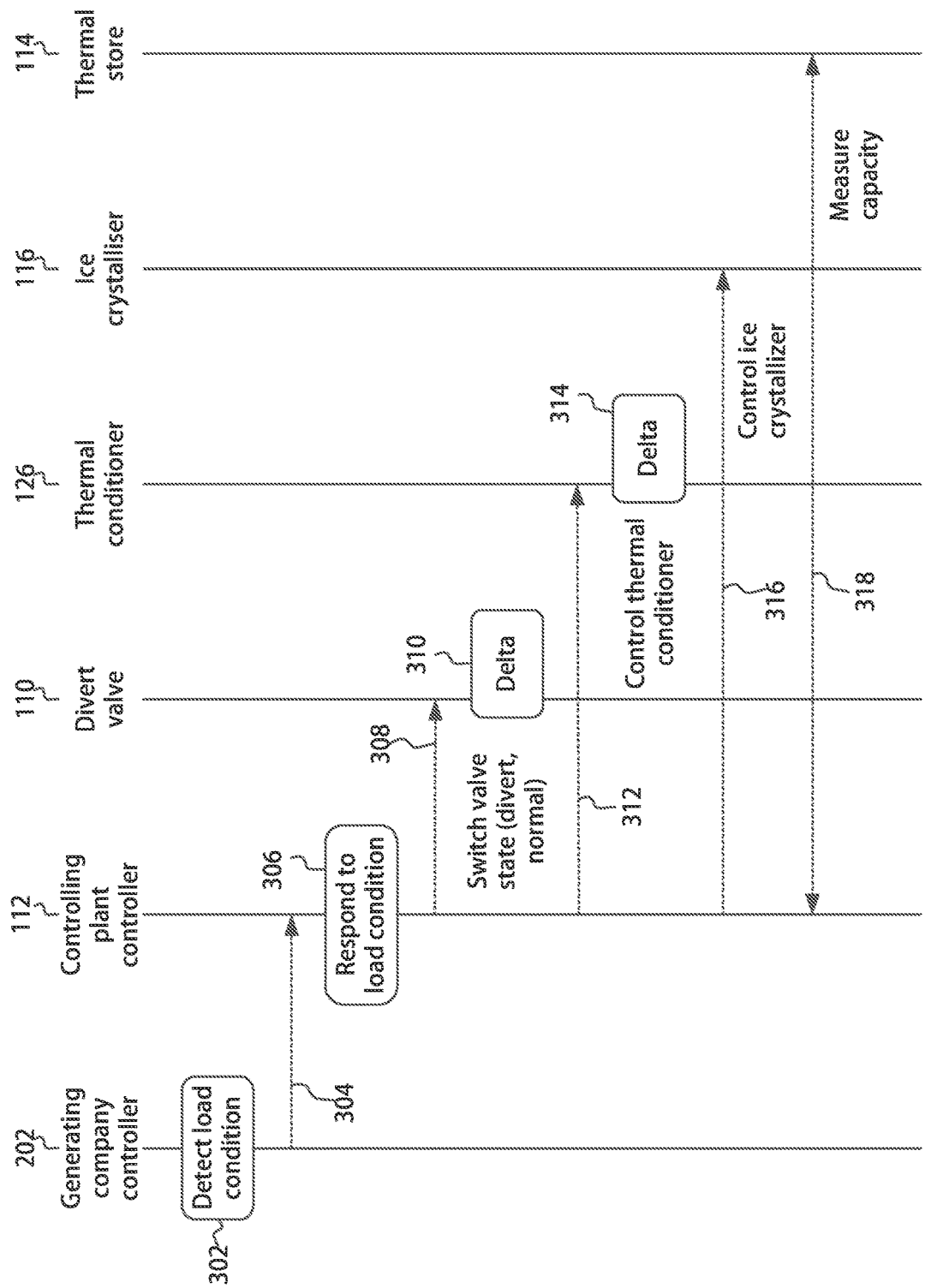
FIG. 3 shows a flow diagram of a cooling system according to embodiments.

FIG. 3 is a view 300 showing a flow chart or flow diagram of operations according to an embodiment. The controller 112 can detect and respond to a load condition or other event. The response of the controller 112 in the embodiment illustrated, is twofold. Firstly, a control signal 308 such as, for example, the above described one or more than one control signal 136, can be issued to the divert valve 110. In response to receiving the control signal 308, the divert valve, at 310, can switch its state of operation. The controller 112, secondly, can output a control signal 312 to the thermal conditioner 126. In response to receiving the control signal 312, the thermal conditioner 126 can change, at 314, its state or power consumption mode as described above with reference to FIG. 1. The controller 112 can issue a control signal 316 arranged to influence the operation of the working fluid conditioner 116. The control signal 116 can be an embodiment of the above described one or more than one control signal 134.

Additionally, or alternatively, a power company controller 202, optionally, may detect a predetermined supply/demand condition or event 302. Embodiments of a power company can comprise one or more of a power generator, a distribution network operator, a virtual power station operator and a demand side aggregator taken jointly and severally. The predetermined supply/demand condition or event may represent an actual or potential for demand for electricity exceeding supply or some other variation in or associated with the supply. In response to the predetermined supply/demand event 302, the generating company controller 202 can issue a control signal 304 to the controller 112. The controller 112 can respond, at 306, to the received control signal 304. In this embodiment, the received control signal 304 is an example of such an other event described above.

In addition to the foregoing or as an alternative to the foregoing the controller 112 can be arranged to determine the energy available from the phase change material stored within the thermal store 114. As described above with reference to FIG. 1, the amount of energy available from the phase change material stored within the thermal store 114 is determined, by the load cells 134 and 136, providing an indication of the combined weight of the thermal store together with its content. Embodiments provide for such content being at least one of the working fluid in the liquid phase and the ice slurry derived from the working fluid. Suitably, the controller 112 exchanges data 318 with the thermal store or, more particularly, the load cells associated with the thermal store.

It will be appreciated that FIG. 3 comprises signalling that can be applicable to, or that described any or all embodiments within this application. FIG. 3 comprises signalling according to at least three embodiments, which can be, firstly, an embodiment in which the energy in the thermal store is used to replace or supplement the cooling capacity of the thermal conditioner 126, secondly, an embodiment in which balancing services are applied by an external controller and, thirdly, in which the controller 112 determines the cooling capacity, that is, the energy stored within the thermal store 114, by determining the weight of the thermal store and its content.

The response of the divert valve 110 to the received control signal 308 can be at least one of switching the divert valve into the first state or switching the divert valve into the second state.

The response of the thermal conditioner 126 to the control signal 312 can be at least one of switching the thermal conditioner into a lower power consumption state or into a higher power consumption state such as, for example, switching the thermal conditioner 126 into a state in which it conditions the working fluid within the primary circuit 104 to maintain or otherwise influence a condition, such as, for example, the temperature, of the thermal load 128 or switching the conditioner 126 into a state in which it does not condition the working fluid within the primary circuit 104 and, thereby, in which it does not influence the condition or state of the thermal load 128.

Figure 4:
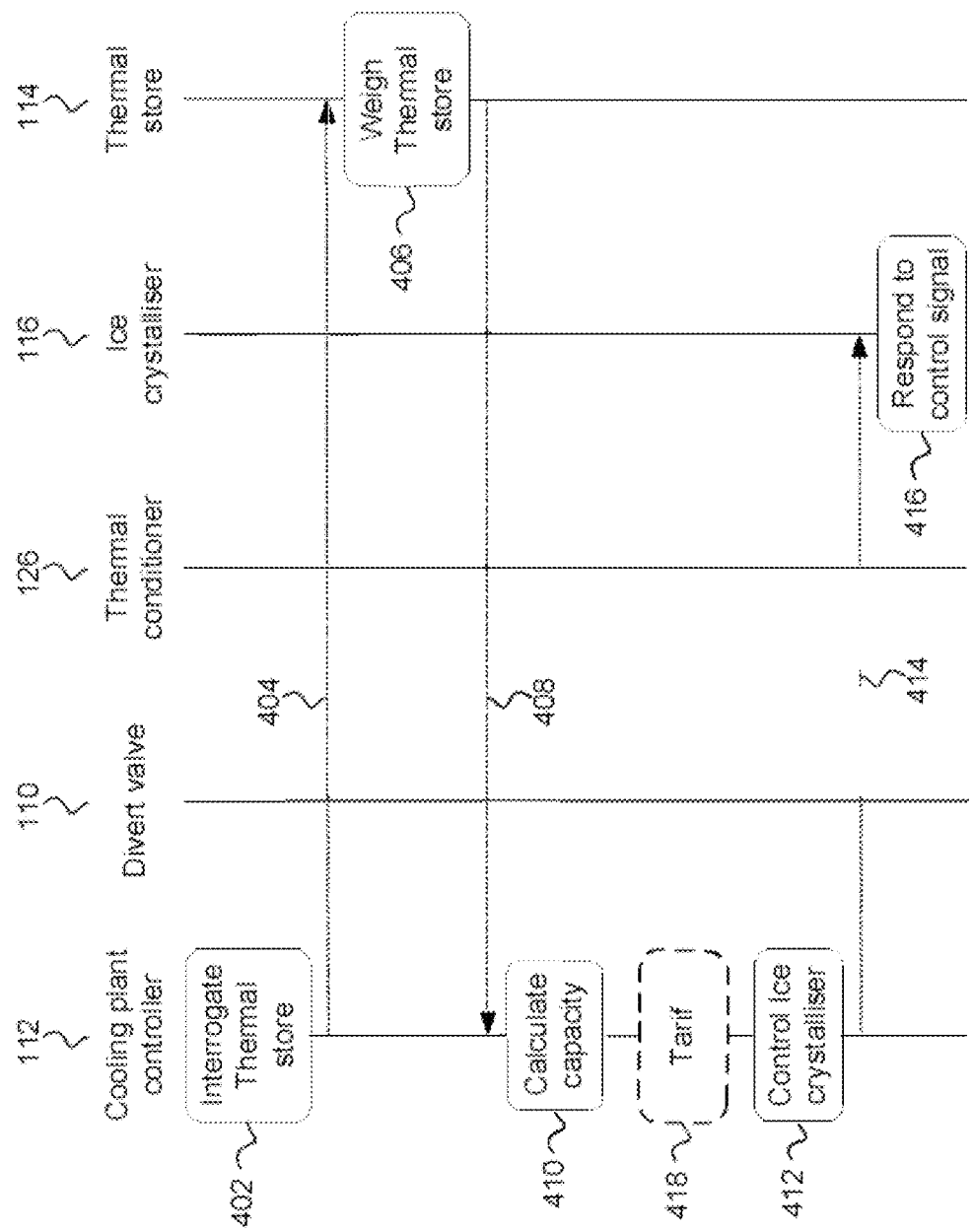
FIG. 4 depicts a flow diagram of a cooling system according to embodiments.

Referring to FIG. 4, there is a shown a view 400 of a flow diagram associated with embodiments, such as operations of the system 102, in particular, associated with determining the energy stored within the thermal store 114. The controller 112 interrogates, at 402, the thermal store 114 via a respective control signal 404, or other message. The thermal store 114, in response to processing the control signal 404 or other message, weighs the thermal store, at 406, and provides data associated with that weight via one or more than one respective control signal 408 to the controller 112. In response to receiving the data 408, the controller 112, at 410, can determine or otherwise calculate the energy stored within the thermal store 114.

Additionally, or alternatively, the controller 112, at 412, can determine that the calculated energy stored within the thermal store 114 is less than a predetermined storage capacity associated with the thermal store 114 and, accordingly, can issue a control signal 414 to the working fluid conditioner 116 to recharge the thermal store by, for example, producing an ice slurry from the working fluid. For example, the controller 112 can switch on the ice crystalliser 116. In response to the control signal 414, the working fluid conditioner 116, at 416 produces the ice slurry of the working fluid. Conversely, if the determination at 412 is such that the energy stored within the thermal store 114 is at the predetermined storage capacity, the control signal 414 can be arranged to stop the working fluid conditioner 116 from recharging the thermal store 114.

In the embodiments, it will be appreciated that the ice slurry of the working fluid comprises particles in the solid phase. The particles in the solid phase can comprise ice crystals. Embodiments can be realised in which the ice crystals have predetermined dimensions. The predetermined dimensions of the ice crystals can comprise, for example, a predetermined diameter of ice crystals. The predetermined diameter can have values within the range of 0.1 mm to 1 mm or substantially 0.1 mm to 1 mm. Alternatively, or additionally, the ice crystals have a predetermined surface area to volume ratio. The predetermined surface area to volume ratio can be influenced by the type of depressant.

The above embodiments have generically referred to the "working fluid". Embodiments can be realised in which the working fluid comprises, for example, water bearing a crystallisation point depressant such as, for example, ethylene glycol, propylene glycol or others that support using melting enthalpy as the cooling mechanism. The working fluid can be, or can comprise, urea, for example or other working fluid in respect of which legislation associated with use of that working fluid does not apply.

Similarly, having calculated the energy stored within the thermal store 114, the controller 112 can determine that the thermal store is full, or has at least reached a predetermined threshold, such that the working fluid conditioner 126 can be switched off or at least switched into a lower power consumption state. Accordingly, the controller 112 can determine, at 412, that the working fluid conditioner 126 should be switched into the lower power consumption state. A signal 414 to that effect can be output to the working fluid conditioner 126, which can respond accordingly, at 416 by switching to the lower power consumption state.

Alternatively, or additionally, rather than the controller 112 determining, at 412, whether or not to switch on or off the working fluid conditioner 116 in response to determining the energy stored within the thermal store 114, the controller 112 can, at 418, determine whether or not to switch on or off the working fluid conditioner 116 according to some other criterion or criteria. Embodiments can be realised in which the other criterion can comprise a predetermined time or time period. Embodiments can be realised in which the predetermined time or period corresponds to a time or period at which a tariff for operating the working fluid conditioner 116 or the thermal conditioner 126 is or is not cost effective.

Therefore, for example, embodiments can be realised in which the working fluid conditioner 116 is switched into a state of producing the ice slurry from the working fluid during a period over which a lower cost energy tariff applies.

Figure 5:
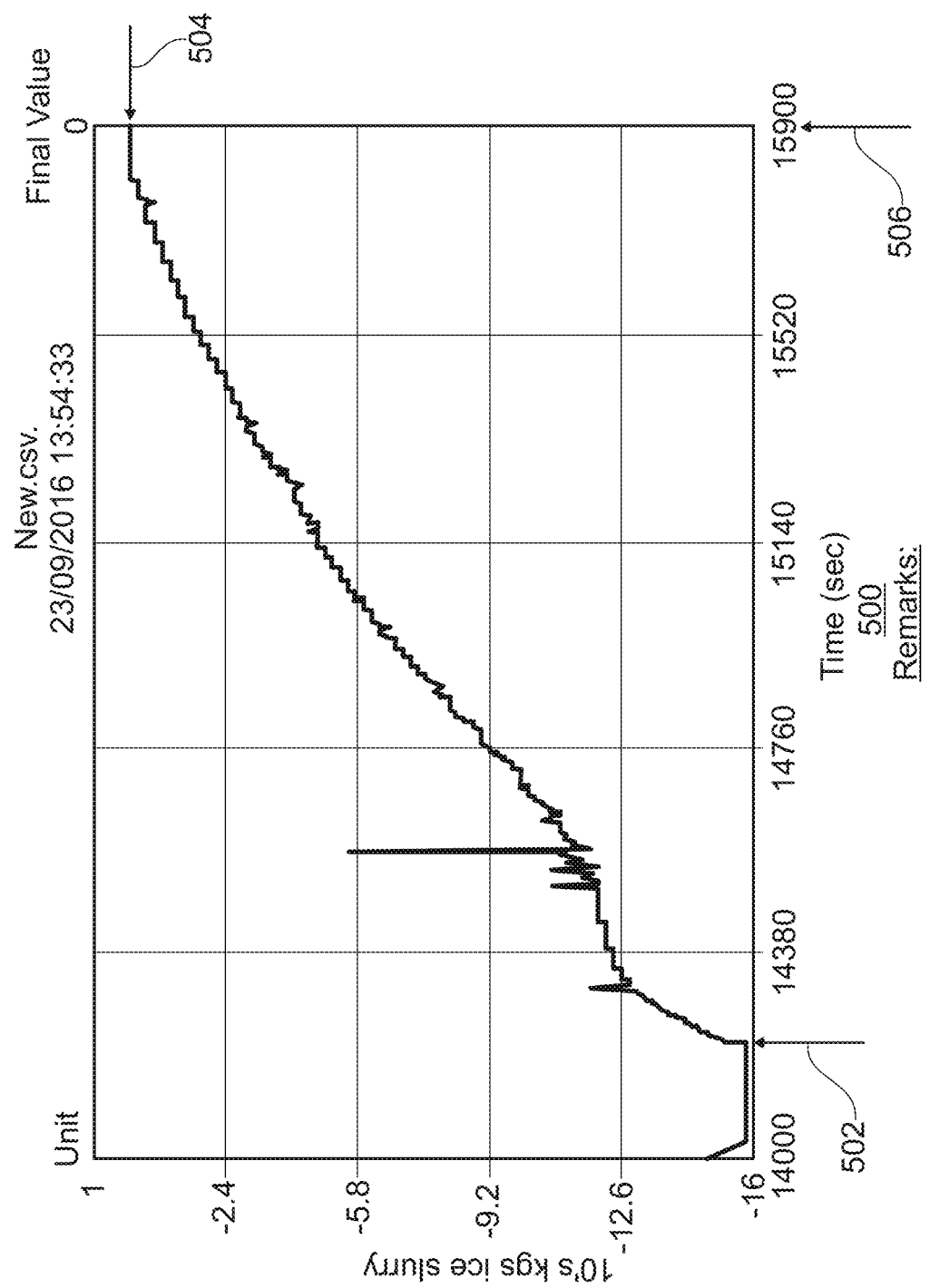
FIG. 5 shows a performance graph of charge accumulation in a thermal store according to embodiments.

FIG. 5 shows a view 500 of the variation of energy stored within the thermal store 114 with time. The time is indicated in seconds, that is, the units along the time axis are seconds. The units along the vertical axis are kilograms of ice slurry, from which a measure of the amount of cooling capacity or energy that is stored within the thermal store 114 can be derived. It can be appreciated that discharging, or otherwise using, the energy within the thermal store 114 commences at a predetermined point in time 502. At that point in time, the thermal store 114 comprises almost 160 kgs of ice slurry. During the period following the predetermined point in time 502, the thermal store 114 is discharged, that is, the energy contained within the thermal store 114 is used to cool the working fluid by latent heat of fusion comprising melting the ice particles of the ice slurry. It can be appreciated that the thermal store 114 can be fully discharged over a period of less than 2000 seconds. The discharge period can be influenced by one or more than one factor. The one or more than one factor can comprise, for example, at least one of (a) the distribution of the working fluid from the primary circuit 104 over or within the ice slurry, (b) the agitation of the ice slurry, (c) the design of the distributor, and (d) the capacity of the thermal store 114.

Once the load cells 134 and 136 associated with the thermal store 114 indicate that the thermal store 114 is storing a predetermined level of energy 504, the production of the ice slurry can be commenced. In the embodiment shown, the thermal store 114 was depleted to such a predetermined level 504 at time t=195900. Alternatively, or additionally, the working fluid conditioner 116 can be arranged to replenish the thermal store 114 with ice slurry in parallel with the thermal store 114 being discharged.

Figure 6:
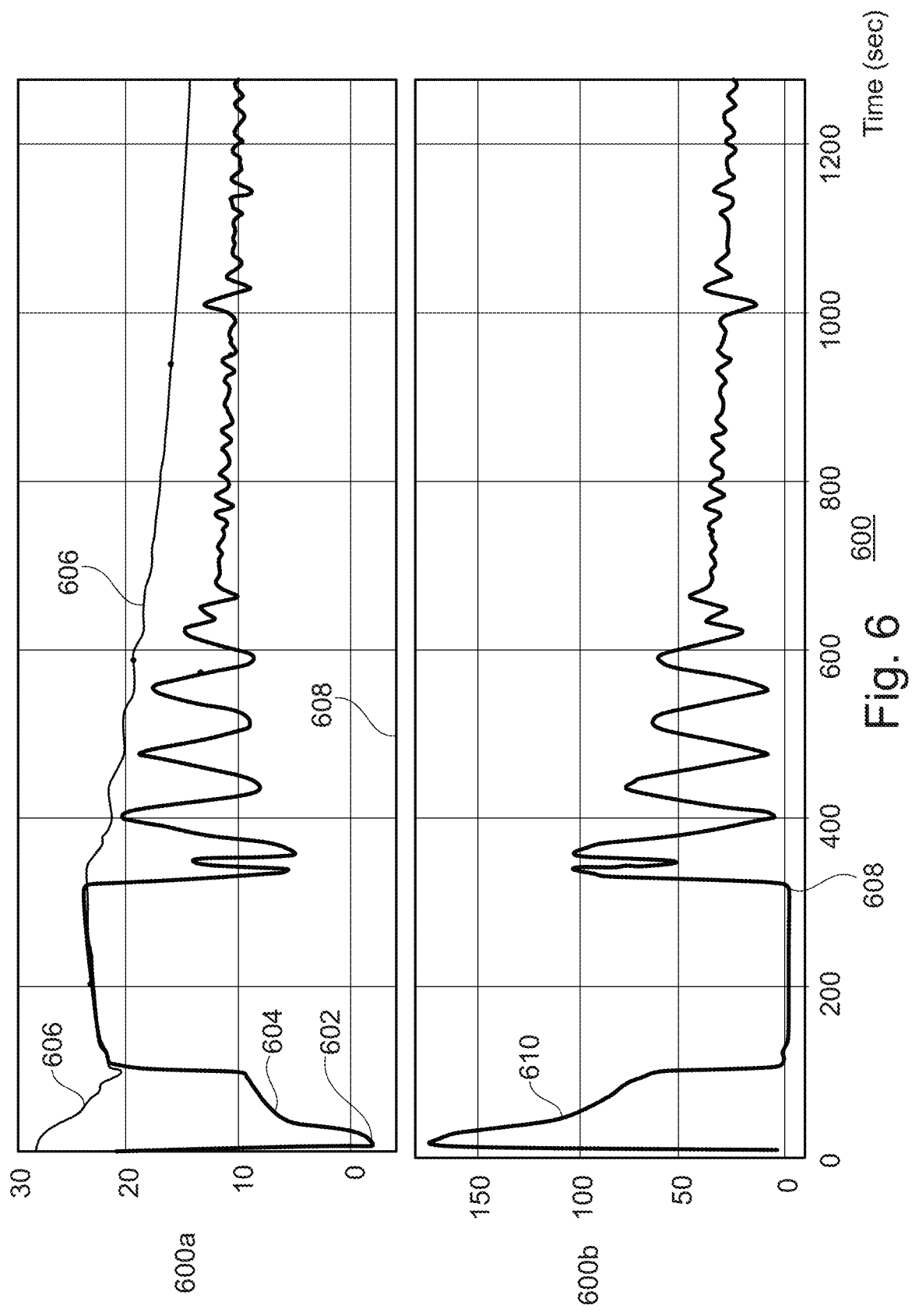
FIG. 6 shows a graph of cooling performance according to embodiments.

Referring to FIG. 6 there is shown a view 600 of a pair of graphs associated with the variation of cooling performance of the system 102 with time. A first graph 600a shows the variation of the temperature of the common working fluid with time. The graph 600a comprise a number of features of interest. A first feature 602 of interest is defined by the period within the first 100 seconds, in particular, within the first 30 to 40 seconds, where there is shown a rapid discharge of the thermal store 114 during which the temperature of the working fluid entering the primary circuit is reduced from almost 30 C to less than zero degrees, more precisely, to about −3 C. Over the period 604 defined by the first 200 seconds, it can be appreciated that the temperature of the working fluid is reduced from almost 30 C to 10 C as depicted by the curve 606 in the experimental data shown.

At a point 608 in time corresponding to almost 350 second, a PID controller (not shown) was used to control the divert valve 110 in conjunction with feedback concerning the temperature of the thermal load 128 with a view to urging the thermal load 128 towards a predetermined temperature. In the data depicted, the predetermined temperature was 18C. It can be appreciated that the temperature of the thermal load 128 progressively decreases towards the target temperature. The progressive decrease is realised over a period of almost 900 seconds.

Referring to FIG. 600b, there is shown the variation of cooling energy supplied by, or discharged from, the thermal store 114 during the period described with reference to FIG. 600a. It can be appreciated that the measure 610 of cooling energy supplied is in antiphase with the temperature of the working fluid entering the primary circuit 104 from the thermal store 114.

In the embodiment from which the data for the graphs 600a and 600b was derived, the thermal store 114 had a capacity of 400 litres, in which was accumulated a mass of 160 kgs of ice. It will be appreciated, however, that the cooling performance of embodiments scales proportionally or linearly with the capacity of the thermal store 114 and the rate of supply of the working fluid from the thermal store 114 to the primary circuit 104, which, in turn is influenced by the operation of any pumps associated with the primary 104 and secondary 106 circuits and the diameters of the conduits, in essence with the volume of the working fluid per unit of time supplied from the thermal store 114 and the working fluid distribution scheme for dispersing the working fluid entering the thermal store 114.

Figure 7:
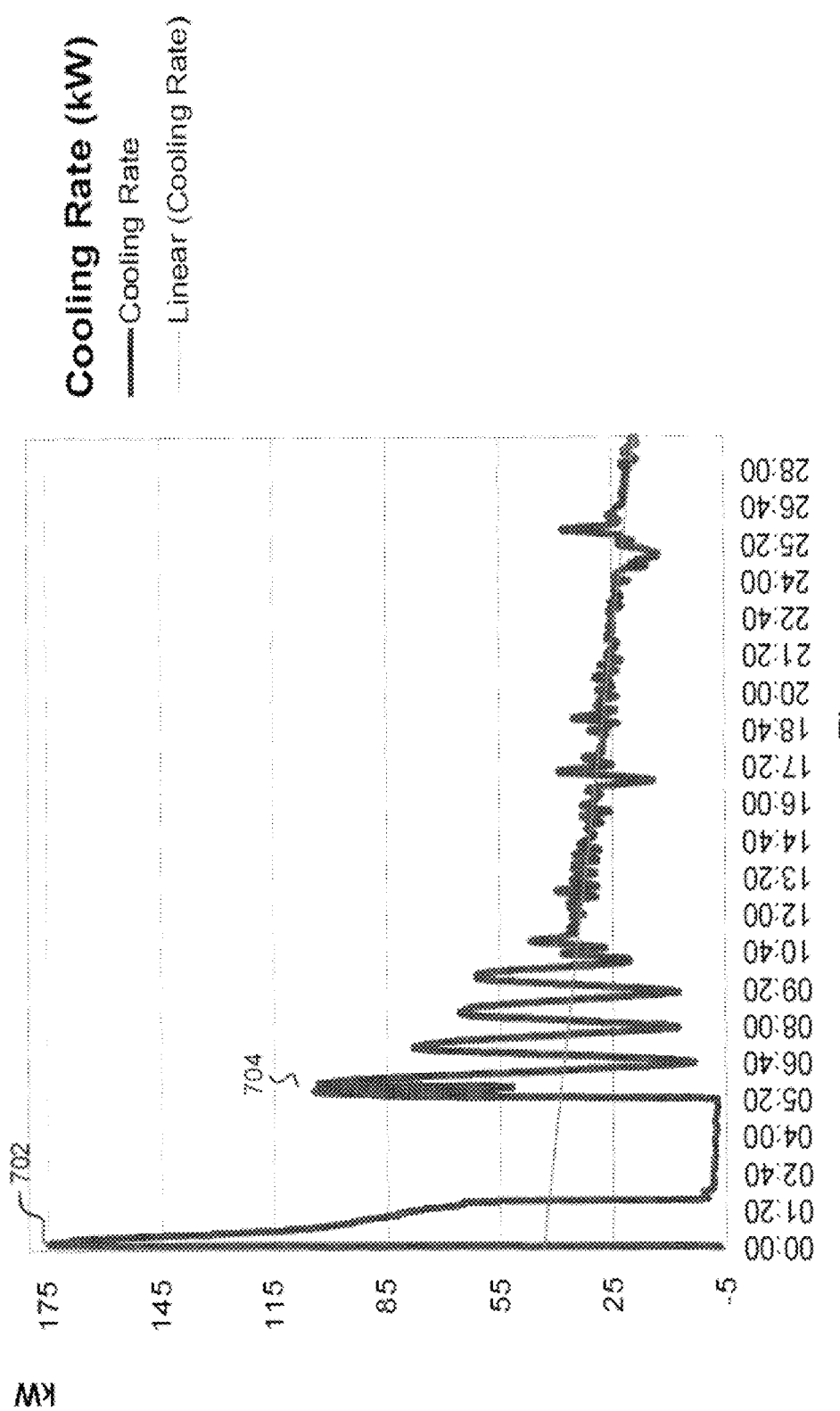
FIG. 7 depicts a graph of cooling performance according to embodiments.

FIG. 7 depicts an expanded view 700 of graph 600b described above. It can be seen that during the first 1 m 20 s cooling energy was supplied at a peak rate of 175 kW 702. This peak was attributable to the cooling effect of the working fluid in liquid phase entering the primary circuit. During the period of time associated with the PID control, that is, from circa 5 m 20 s onwards 704, the cooling energy settles into a steady or linear cooling rate. The cooling effect from point 704 onwards it attributable to the phase change material under the influence of the PID controller.

Figure 8:
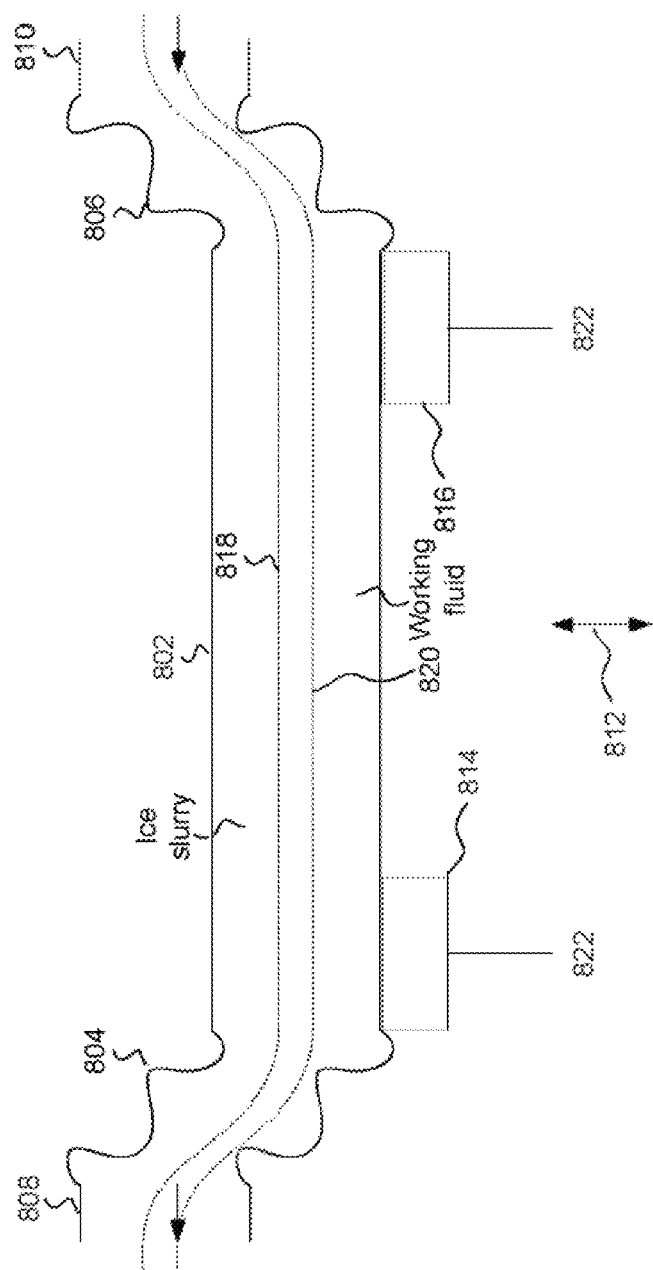
FIG. 8 shows a conduit according to embodiments.

FIG. 8 shows a view 800 of a section of a conduit 802 according to an embodiment. The conduit can comprise part of any conduit of any system described herein or can form part of a conduit coupled to, or associated with, a working fluid conditioner. The conduit 802 is coupled to the rest of the system, or otherwise inserted into the piping of the system, via flexible couplings 804 and 806. The flexible couplings are resiliently deformable. The flexible couplings are arranged to allow the conduit 802 to move relative to piping 808 and 810 associated with the rest of the system. For example, the conduit 802 can be moved in a reciprocating manner as indicated by the corresponding arrow 812.

The conduit 802 has at least one associated load cell for providing a measure associated with the weight of the conduit 802 and its content. In the illustrated embodiment, two load cells 814 and 816 are used. The load cells 814 and 816 are disposed towards the ends of the conduit 802, that is, distally disposed relative to the centre of the conduit 802. However, examples can be realised that use some other number of load cells, such as a single, centrally disposed, load cell.

The conduit 802 is arranged to carry at least one of a working fluid and an ice slurry derived from the working fluid. The working fluid can be the working fluid of any and all examples described in this application. The combined weight of the conduit 802 and its content will vary with the relative proportions of the working fluid and the ice slurry within the conduit 802 vary. In the illustrated example, a pair of ice slurry levels are shown. The pair of ice slurry levels comprise a first ice slurry level 818 and a second ice slurry level 820. The first ice slurry level 818 is associated with a respective percentage of the total content of the conduit 802 being ice slurry derived from the working material and/or the remainder being working fluid. Similarly, the second ice slurry level 820 is associated with a respective percentage of the total content of the conduit 802 being ice slurry derived from the working material and/or the remainder being working fluid. In the example shown, the first level 818 indicates that there is less ice slurry in the conduit 802 than the second level; it being appreciated that the ice particles in the ice slurry are less dense than the working fluid and, therefore, float.

In light of the above, as the percentage or fraction of the ice slurry varies, the weight or measure 822 output by the at least one load, or the pair of load cells 814 and 816, will also vary proportionally. Therefore, the output of the load cell can be calibrated to be relative to the percentage of ice contained with the ice slurry flowing within or through the conduit.

The example shown in FIG. 8 can be used to influence the operation of system 102. For example, the working fluid conditioner 116 can be arranged, under the control of the controller 112 or other entity, to monitor the percentage of ice contained within the ice slurry of the conduit 802 with a view to determining whether or not a target percentage of ice slurry has been reached. As the percentage of the ice contained within the ice slurry of the conduit 802 increases, the weight or measure 822 output by the at least one load cell 814 and 816 decreases. Conversely, as the percentage of the ice contained within the ice slurry in the conduit 802 decreases, the weight or measure 822 output by the at least one load cell 814 and 816 increases.

Therefore, the working fluid conditioner 116 can be in a state that produces ice slurry for the system 102 in response to the weight or measure 822 being below a predetermined threshold or percentage. Additionally, or alternatively, the working fluid conditioner 116 can be in a state that does not produce ice slurry for the system 102 in response to the weight or measure 822 being above a predetermined threshold or percentage. The predetermined threshold or percentage could be, for example, 80%, 90% or 100%, or some other percentage or threshold.

Example implementations can provide a method of thermally managing a heat source using primary and secondary circuits bearing a common working fluid, the first and second circuits being arranged to be coupled to share the common working fluid between the first and second circuits; the method comprising: discharging a thermal store, associated with the second circuit, comprising an ice slurry, derived from the working fluid in the liquid phase, by diverting working fluid from the primary circuit into the thermal store; and communicating working fluid from the thermal store into the primary circuit to influence the temperature of the heat source. Furthermore, example implementations can provide a system for thermally managing a heat source associated with a primary circuit using a thermal store associated with a secondary circuit, the primary and secondary circuits being capable of being selectively coupled to share a common working fluid between the primary and secondary circuits when discharging the energy associated with the thermal store from the secondary circuit into the primary circuit; the thermal store comprising an ice slurry derived from the common working fluid.

Figure 9:
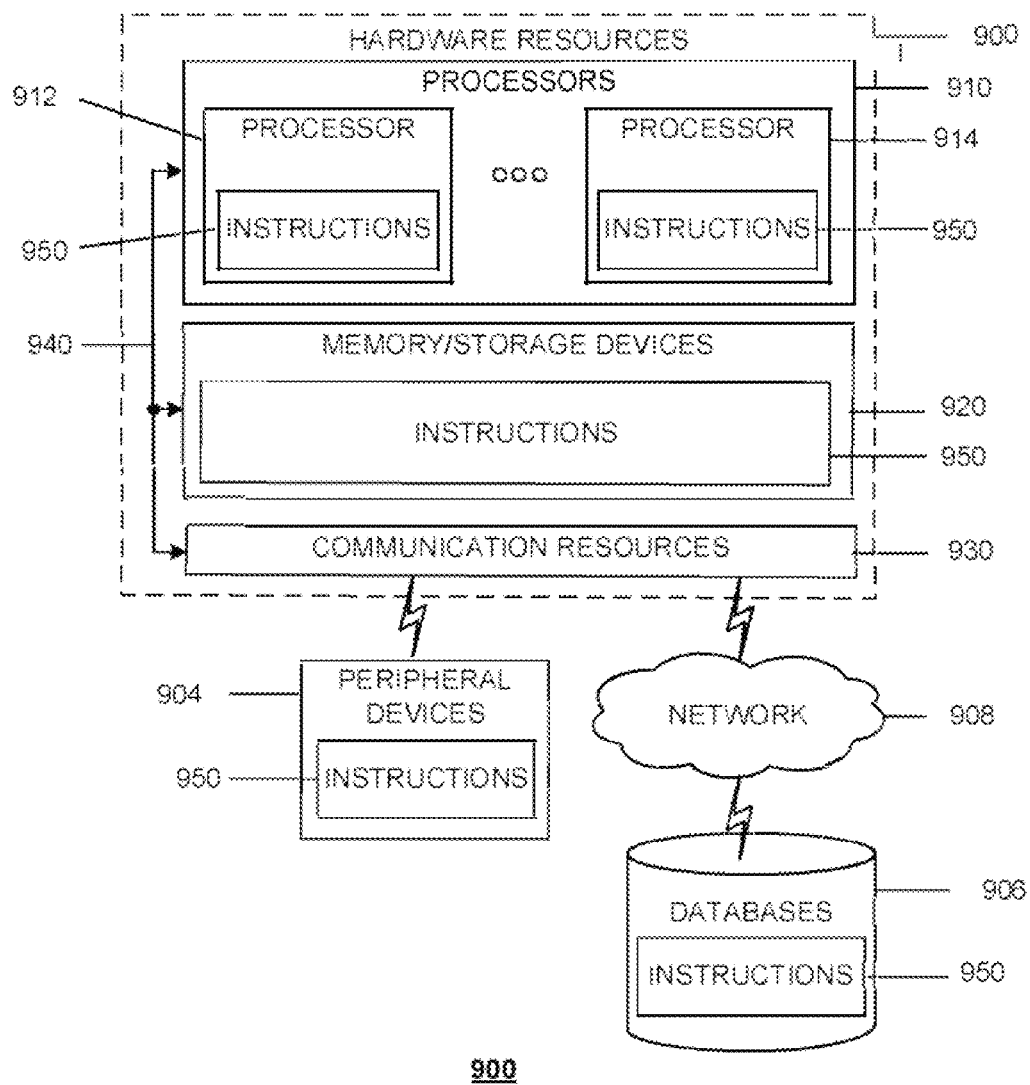
FIG. 9 illustrates a machine executable instructions and machine readable storage according to embodiments.

FIG. 9 is a block diagram illustrating components, according to some example embodiments, able to read instructions from a machine-readable or computer-readable medium (e.g., a machine-readable storage medium) and perform any one or more of the methodologies, systems, devices and flow diagrams discussed herein. Specifically, FIG. 9 shows a diagrammatic representation of hardware resources 900 including one or more processors (or processor cores) 910, one or more memory/storage devices 920, and one or more communication resources 930, each of which are communicatively coupled via a bus 940.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914. The memory/storage devices 920 may include main memory, disk storage, or any suitable combination thereof.

The communication resources 930 may include interconnection and/or network interface components or other suitable devices to communicate with one or more peripheral devices 904 and/or one or more databases 906 via a network 908. For example, the communication resources 930 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 and/or the databases 906. Accordingly, the memory of processors 910, the memory/storage devices 920, the peripheral devices 904, and the databases 906 are examples of computer-readable and machine-readable media.

It will be appreciated that embodiments can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or machine readable storage such as, for example, DVD, memory stick, chip, electronic device or solid state medium. It will be appreciated that the storage devices and storage media are embodiments of machine-readable storage, for example, non-transitory machine-readable storage, that are suitable for storing a program or programs comprising instructions that, when executed, implement embodiments described and claimed herein. Accordingly, embodiments provide machine executable code for implementing a system, apparatus, device or method as described herein or as claimed herein and machine-readable storage storing such a program or programs. Still further, such programs may be conveyed electronically via any medium such as a communication signal carried over a wired or wireless connection and embodiments suitably encompass the same.

Although the embodiments described above use the same working fluid in the primary and secondary circuits, embodiments are not limited to such an arrangement. Embodiments can be realised in which different working fluids are used in the primary and second circuits subject to a heat exchanger coupling the primary and second working fluids.

Embodiments of a cooling plant controller 112 can comprise one or more of a PID controller for controlling the divert valve 110 and a controller for influencing the operation of the ice crystalliser in response to an indication of the state of the thermal store's energy capacity available from the phase change material taken jointly and severally.

The invention claimed is:

1. A system for influencing thermal conditions associated with a thermal load, the system comprising:
   a secondary circuit for bearing a working fluid in a liquid phase and an ice slurry derived from the working fluid, the working fluid in the liquid phase to be supplied into a primary circuit comprising a primary thermal conditioner, the primary circuit for bearing the working fluid in the liquid phase for influencing the temperature of the thermal load in response to the thermal conditioner, and
   a valve, responsive to a control signal, to modulate between:
   a first state for coupling the primary circuit to be in fluid communication with the secondary circuit to cool the working fluid in the liquid phase using the ice slurry derived from working fluid via latent heat phase change of the ice slurry; and
   a second state for decoupling the primary circuit from the secondary circuit so that the primary and secondary circuits are not in fluid communication.

2. The system of claim 1, in which the secondary circuit comprises an ice crystalliser for forming ice crystals derived from the working fluid.

3. The system of claim 2, in which the ice crystals have predetermined dimensions.

4. The system of claim 3, in which the predetermined dimensions are 0.1 mm to 1 mm.

5. The system of claim 1, further comprising a thermal store for storing at least the ice slurry.

6. The system of claim 5, comprising an indicator for providing a measure of the energy available from the ice slurry contained within the thermal store.

7. The system of claim 6, in which the measure is associated with the weight of at least the ice slurry contained within the thermal store.

8. The system of claim 5, in which the valve is arranged to divert working fluid from the primary circuit into the thermal store.

9. The system of claim 5, in which the thermal store is in communication with the primary circuit or in communication with the primary circuit and the secondary circuit.

10. The system of claim 5, in which the thermal store comprises a primary circuit ingress coupling and a primary circuit egress coupling for allowing working fluid to flow into the thermal store from the primary circuit and for allowing cooled working fluid to flow into the primary circuit from the thermal store.

11. The system of claim 5, in which the thermal store does not comprise a gas.

12. The system of claim 5, in which the thermal store comprises an agitator to agitate the ice slurry within the thermal store.

13. The system of claim 1, in which the working fluid comprises a crystallisation point depressant.

14. The system of claim 13, in which the crystallisation point depressant comprises at least one of urea, ethylene glycol, propylene glycol, sodium chloride, ethanol and methanol.

15. The system of claim 1, in which the temperature of the working fluid in the primary circuit is between −30 C and +15 C.

16. The system of claim 1, in which the control signal of the valve is responsive to an increase in the temperature of the working fluid in the primary circuit.

17. The system of claim 1, in which the control signal is operable to switch the valve into the first state.

18. The system of claim 1, in which the control signal is operable to switch the valve into the second state.

19. The system of claim 1, in which the primary thermal conditioner is responsive to a respective control signal.

20. The system of claim 19, in which the primary thermal conditioner is responsive to the respective control signal to influence the operation of the primary thermal conditioner.

21. The system of claim 20, in which the respective control signal influences the operation of the primary thermal conditioner to increase or decrease power consumption of the primary thermal conditioner.

22. The system of claim 20, in which the primary thermal conditioner is operable, in response to the respective control signal, to vary the thermal condition.

23. The system of claim 20, in which the respective control signal influences the operation of the primary thermal conditional to switch the primary thermal conditional on or off.

* * * * *